(12) United States Patent
Weng et al.

(10) Patent No.: US 12,102,192 B2
(45) Date of Patent: Oct. 1, 2024

(54) MAGNETIC BUCKLE DEVICE

(71) Applicant: SINOX COMPANY LTD., New Taipei (TW)

(72) Inventors: Chia-Wei Weng, Taipei (TW); Yueh-Cheng Huang, Taipei (TW); Hao-Jhong Lyu, Taipei (TW); Wen-Cheng Huang, Taipei (TW)

(73) Assignee: SINOX COMPANY LTD., New Taipei (TW)

( * ) Notice: Subject to any disclaimer, the term of this patent is extended or adjusted under 35 U.S.C. 154(b) by 195 days.

(21) Appl. No.: 17/848,542

(22) Filed: Jun. 24, 2022

(65) Prior Publication Data

US 2023/0000216 A1 Jan. 5, 2023

Related U.S. Application Data

(60) Provisional application No. 63/217,366, filed on Jul. 1, 2021.

(51) Int. Cl.
*A44B 18/00* (2006.01)
*A45C 13/10* (2006.01)

(52) U.S. Cl.
CPC ...... *A44B 18/0003* (2013.01); *A44B 18/0069* (2013.01); *A45C 13/1069* (2013.01); *A44D 2203/00* (2013.01)

(58) Field of Classification Search
CPC . A44B 18/00; A44B 18/0003; A44B 18/0023; A44B 18/0046; A44B 18/0007; A44B 18/0011; A44B 18/0015; A44B 18/0019; A44B 18/0069; A44B 18/0073; A44B 18/0076; A44D 2203/00; A45C 13/00; A45C 13/10; A45C 13/1069
USPC .............................................. 70/58
See application file for complete search history.

(56) References Cited

U.S. PATENT DOCUMENTS

| | | | | |
|---|---|---|---|---|
| 6,189,348 | B1* | 2/2001 | Huang | E05B 65/5284 24/615 |
| 11,006,699 | B1* | 5/2021 | Goodwin | A44B 11/2584 |
| 2007/0107169 | A1* | 5/2007 | Kung | A44B 11/258 24/308 |
| 2013/0186723 | A1* | 7/2013 | D'Angelo | A45C 5/146 190/18 A |

* cited by examiner

*Primary Examiner* — Nathan Cumar
(74) *Attorney, Agent, or Firm* — Best & Flanagan LLP

(57) ABSTRACT

A magnetic buckle device has a first base, a second base, a first component mounted to the first base, a second component mounted to the second base, and a lock mechanism. A magnetic attraction force is generated between the first component and the second component to move the first base and the second base toward each other. The lock mechanism is connected to the second base and has a locked status and an unlocked status. The lock mechanism has an engaging component and an unlocking component. In the locked status, the first base and the engaging component engage with each other such that the first base and the engaging component are inseparable. In the unlocked status, the unlocking component is capable of being operated to allow the first base and the engaging component to disengage from each other.

14 Claims, 21 Drawing Sheets

MAGNETIC BUCKLE DEVICE

BACKGROUND OF THE INVENTION

1. Field of the Invention

The present invention relates to a buckle device, especially to a buckle device that is utilized to a bag, a backpack, a box, a suitcase, etc. The buckle device is detachably connected to two components and can be applied to various locks.

2. Description of the Prior Arts

One of the defects of a conventional buckle device, such as a lock or a suitcase, is that to insert a male part into a female part of the buckle device, the user has to precisely align the male part to the female part and then insert the male part into the female part of the buckle device with a certain force, which is not convenient. Especially, when locking up the buckle device, one hand of the user may not be available, and therefore the buckle device cannot be locked up with ease.

To overcome the shortcomings, the present invention provides a magnetic buckle device to mitigate or obviate the aforementioned problems.

SUMMARY OF THE INVENTION

The main objective of the present invention is to provide a buckle device which can be fastened with ease.

The magnetic buckle device has a first base, a second base, a first component, a second component, and a lock mechanism. The first component is mounted to the first base. The second component is mounted to the second base. A magnetic attraction force is generated between the first component and the second component to move the first base and the second base toward each other. The lock mechanism is connected to the second base and has a locked status and an unlocked status. The lock mechanism has an engaging component and an unlocking component. In the locked status, the first base and the engaging component engage with each other such that the first base and the engaging component are inseparable. In the unlocked status, the unlocking component is capable of being operated to allow the first base and the engaging component to disengage from each other.

When connecting the first base to the second base and the two bases are close to each other, the magnetic attraction force between the first component and the second component facilitates guiding the first and second bases to connect so that the first and second bases can be connected with ease. The magnetic attraction force also helps the engaging component of the lock mechanism to engage with the first base such that the first base, the second base and the lock mechanism are connected together. Then, the lock mechanism can be set to a locked status to ensure the first base cannot separate. After switching the lock mechanism to the unlocked status (via inserting a key or input correct combination, for example), the first base and the engaging component can be disengaged by operating (pressing or rotating, for example) the unlocking component of the lock mechanism, thereby allowing the first base to be separated.

The magnetic attraction force facilitates guiding the first and second bases to connect, and the magnetic attraction force also helps to maintain connection. Therefore, the present invention does not require excessive structure for connection, thereby requiring less force from the user to connect and greatly improve ease of use.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
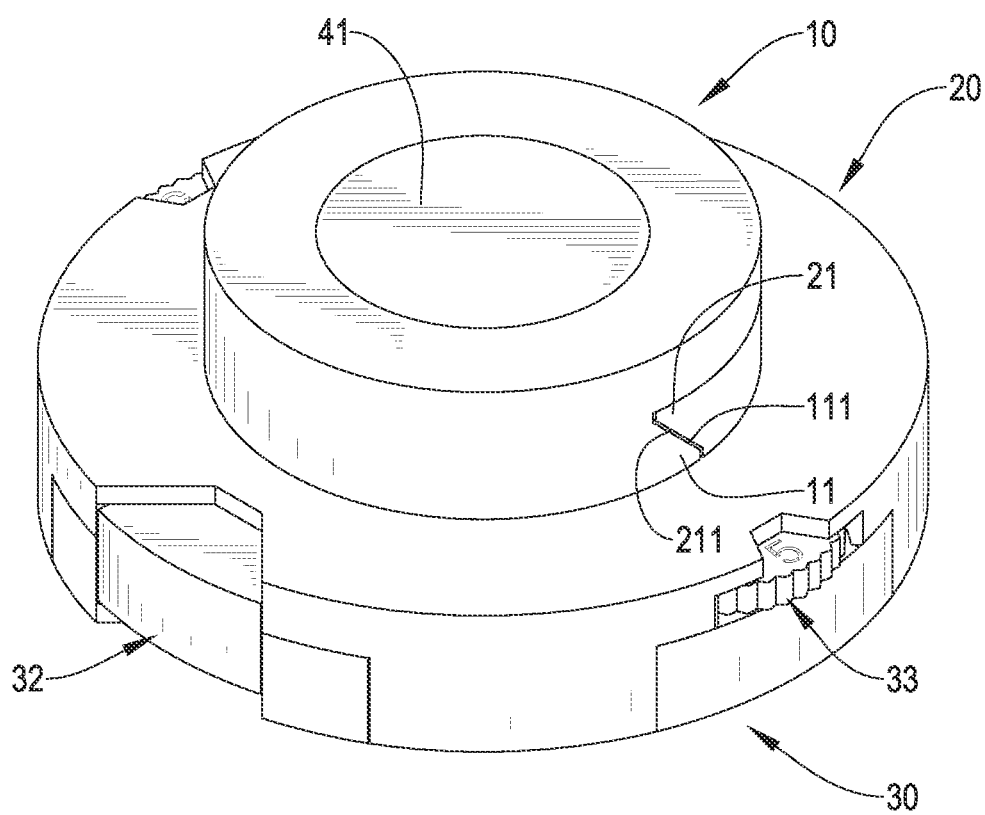
FIG. 1 is a perspective view of a first embodiment of a magnetic buckle device in accordance with the present invention.
Figure 2:
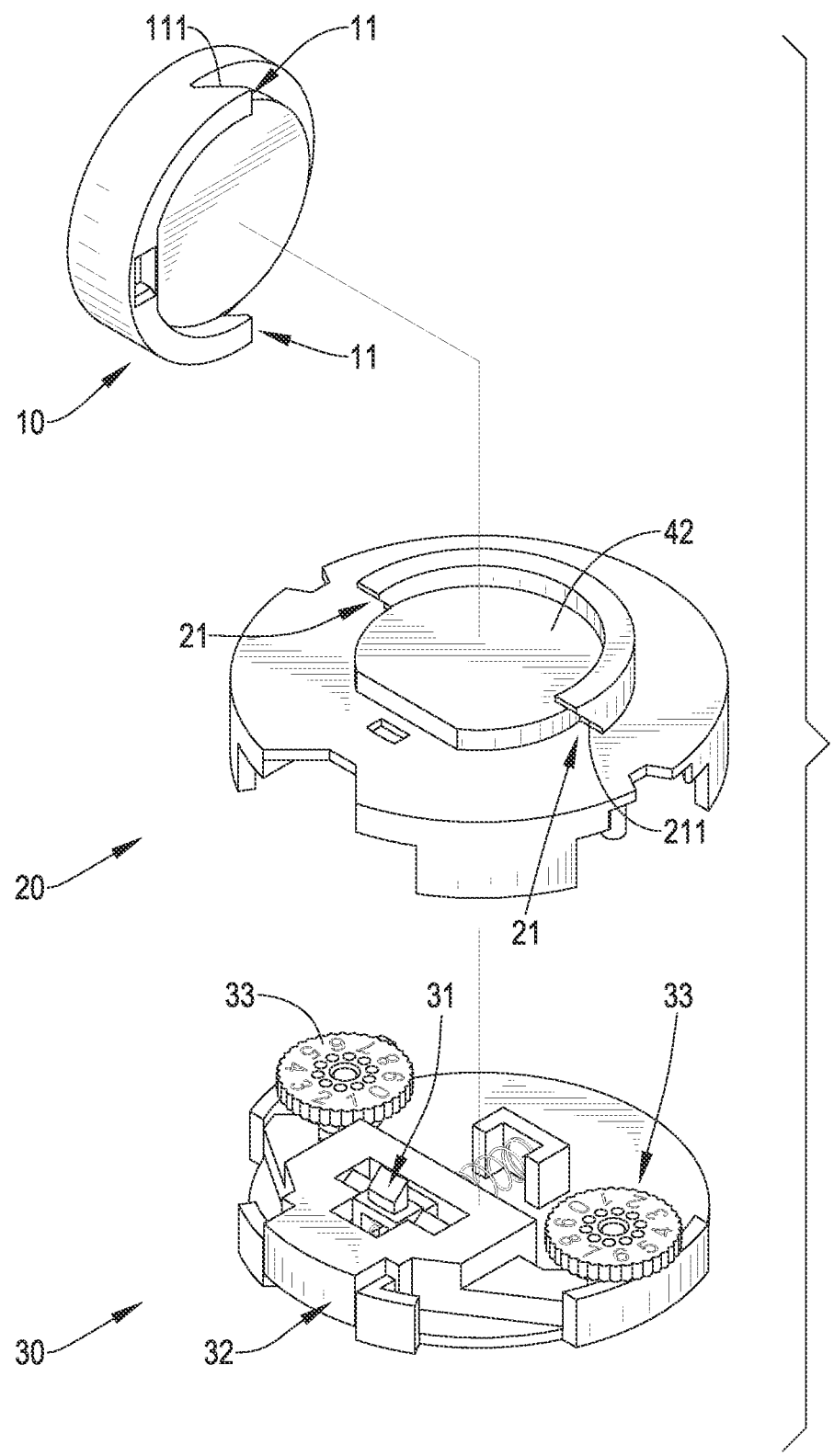
FIGS. 2 and 3 are exploded perspective views of the magnetic buckle device in FIG. 1.
Figure 3:
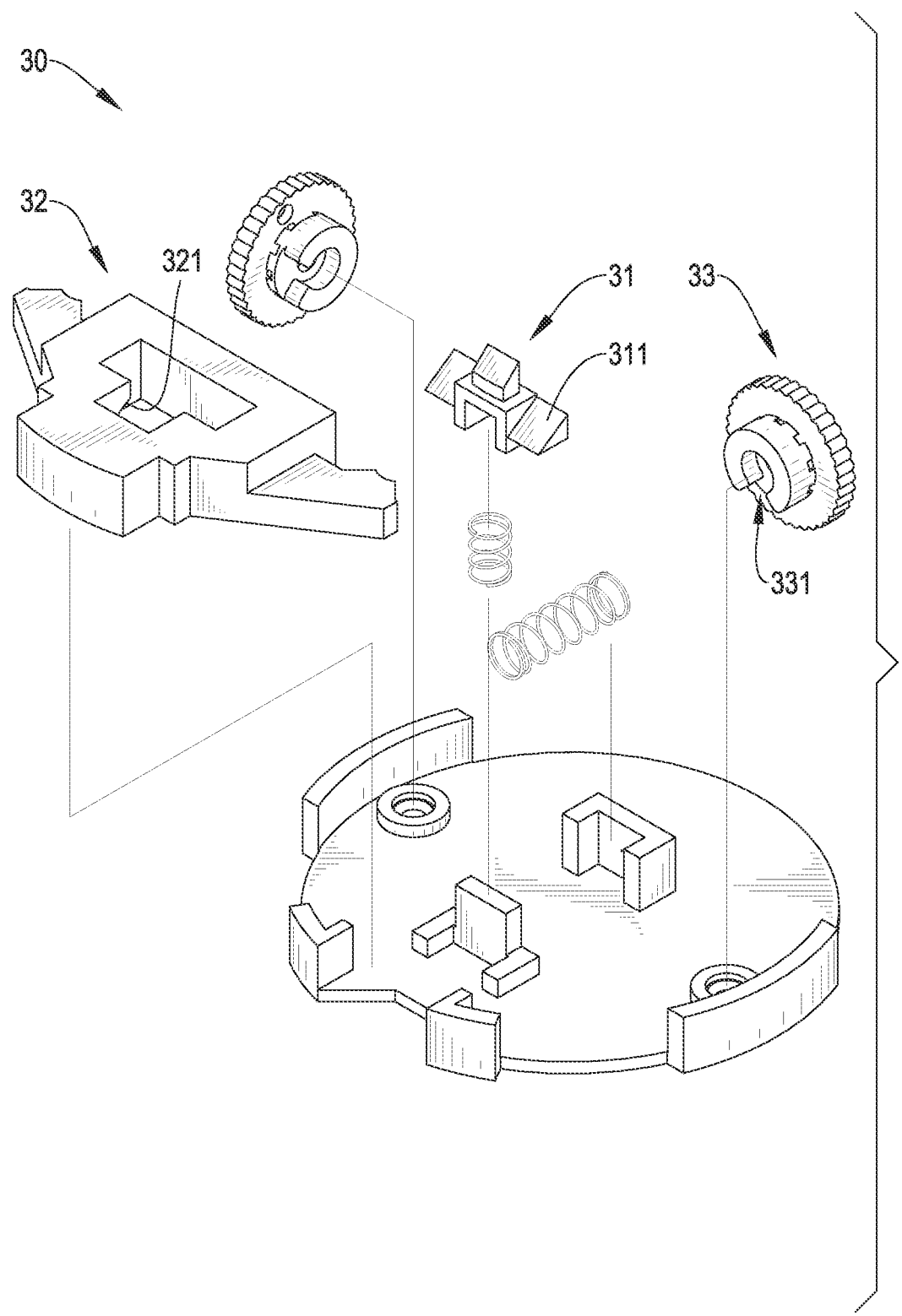
Figure 4:
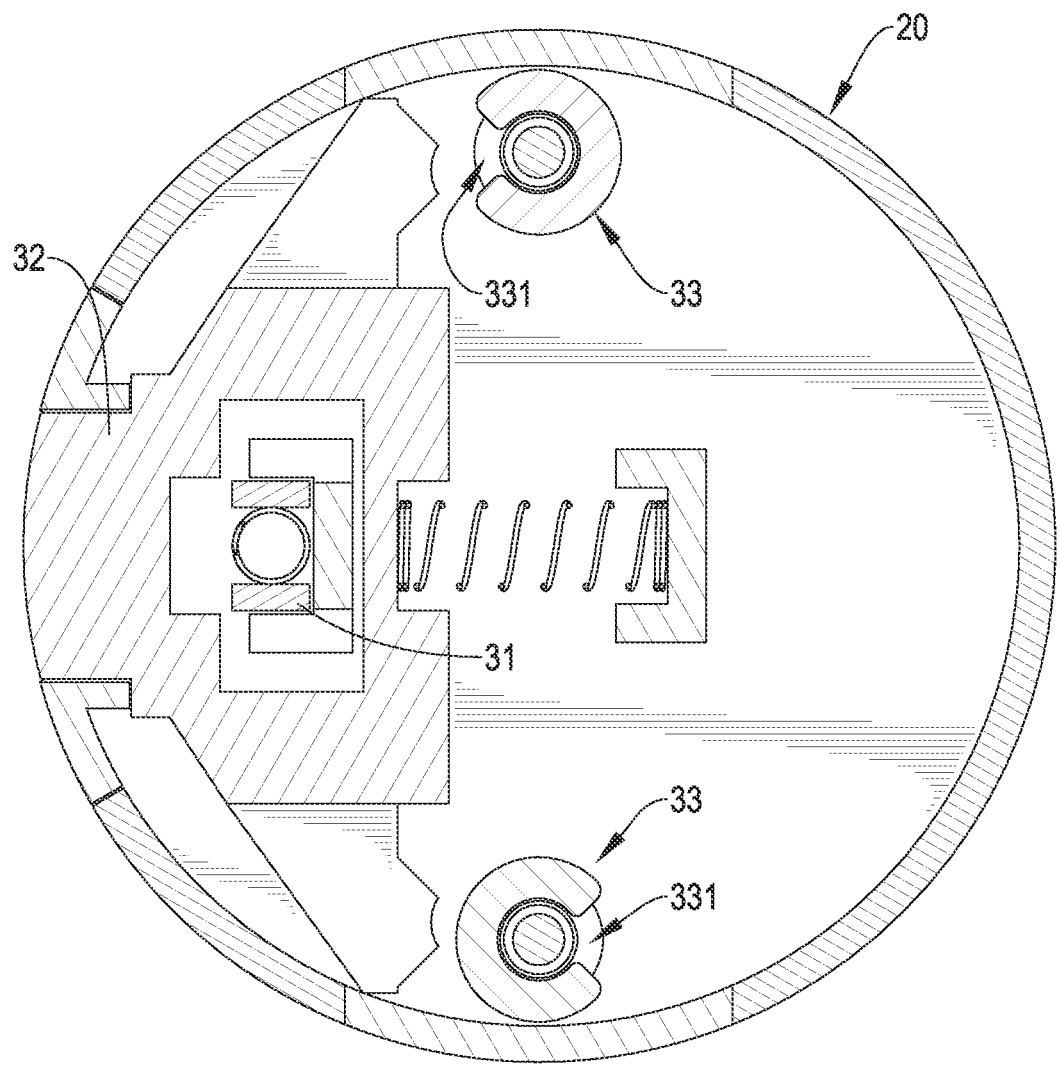
FIG. 4 is a sectional top view of the magnetic buckle device in FIG. 1.

With reference to FIGS. 1, 2, 8, 9, 13, and 15, a magnetic buckle device in accordance with the present invention comprises a first base 10, a second base 20, a first component 41, a second component 42, and a lock mechanism 30.

The first component 41 is mounted to the first base 10, and the second component 42 is mounted to the second base 20. A magnetic attraction force is generated between the first component 41 and the second component 42 to move the first base 10 and the second base 20 toward each other.

One of the first component 41 and the second component 42 may be a magnet and the other one is ferromagnetic material, or both of them are magnets, as long as the magnetic attraction force is generated therebetween. Additionally, the first component 41 and second component 42 can be either non-integrally formed or integrally formed with the part to which it is mounted. For example, the first component 41 can be integrally formed with the first base 10 so that the first base 10 is magnet or ferromagnetic material, and the second component 42 can be integrally formed with the second base 20 so that the first base 10 is magnet or ferromagnetic material.

The lock mechanism 30 is connected to the second base 20 and has a locked status and an unlocked status. The lock mechanism has an engaging component 31 and an unlocking component 32. The engaging component 31 is configured to engage with the first base 10. In the locked status, the first base 10 and the engaging component 31 engage with each other such that they are inseparable.

In the unlocked status, the unlocking component 32 is capable of being operated to allow the first base 10 and the engaging component 31 to disengage from each other; that is, the lock mechanism 30 in one embodiment can be designed in a way that an external force needs to be applied to the first base 10 to disengage the first base 10 from the engaging component 31 (as shown in a third embodiment in accordance with the present invention), or the lock mechanism 30 in another embodiment can be designed in a way that the unlocking component 32 directly makes the first base 10 disengage from the engaging component 31 when the unlocking component 32 is operated (by pressing down or rotating, for example) (as shown in a first embodiment and a second embodiment in accordance with the present invention).

Figure 17:
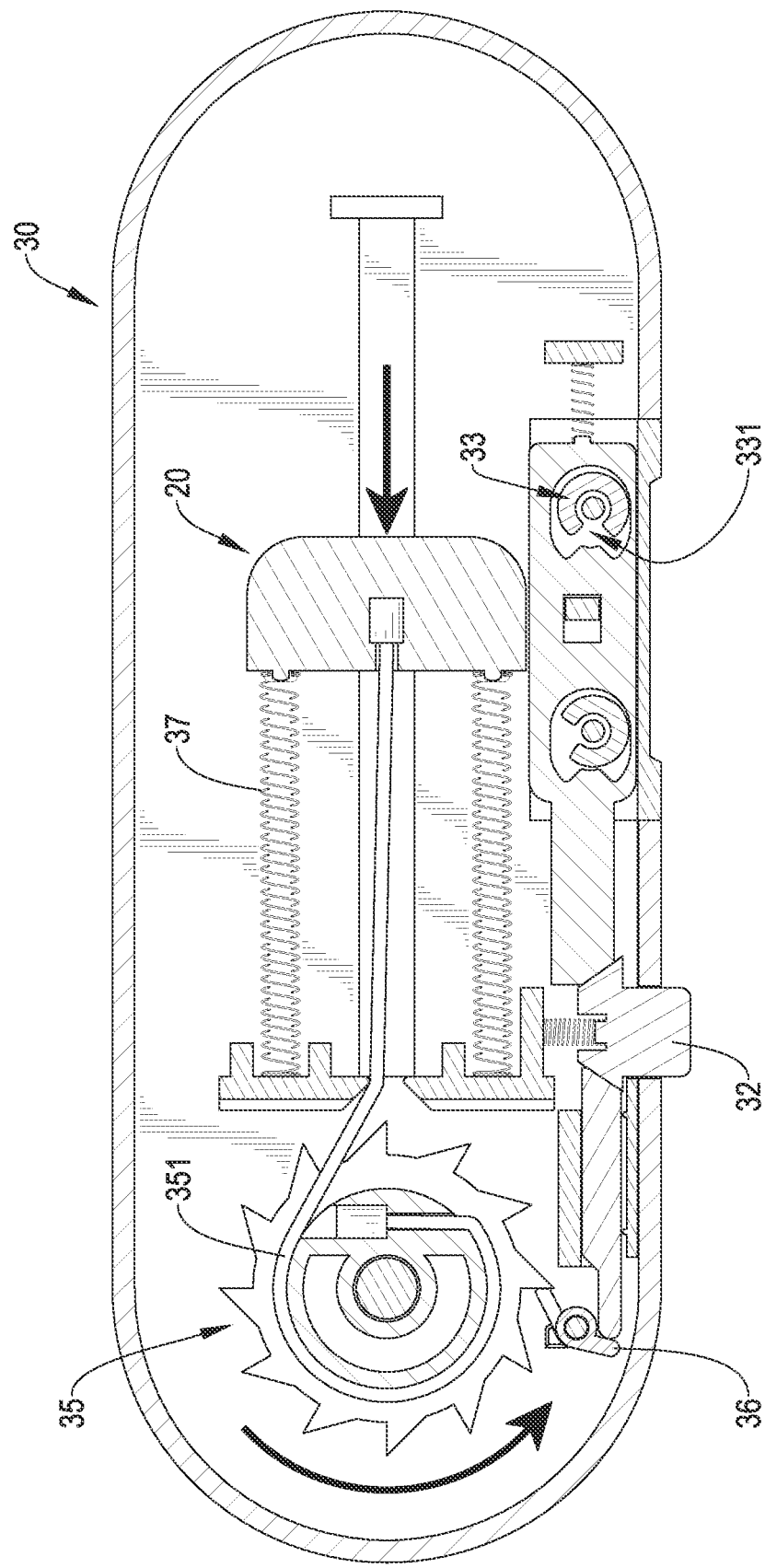
FIGS. 17 and 18 are top sectional views of the magnetic buckle device in FIG. 13, showing different operating statuses of the magnetic buckle device.
Figure 18:
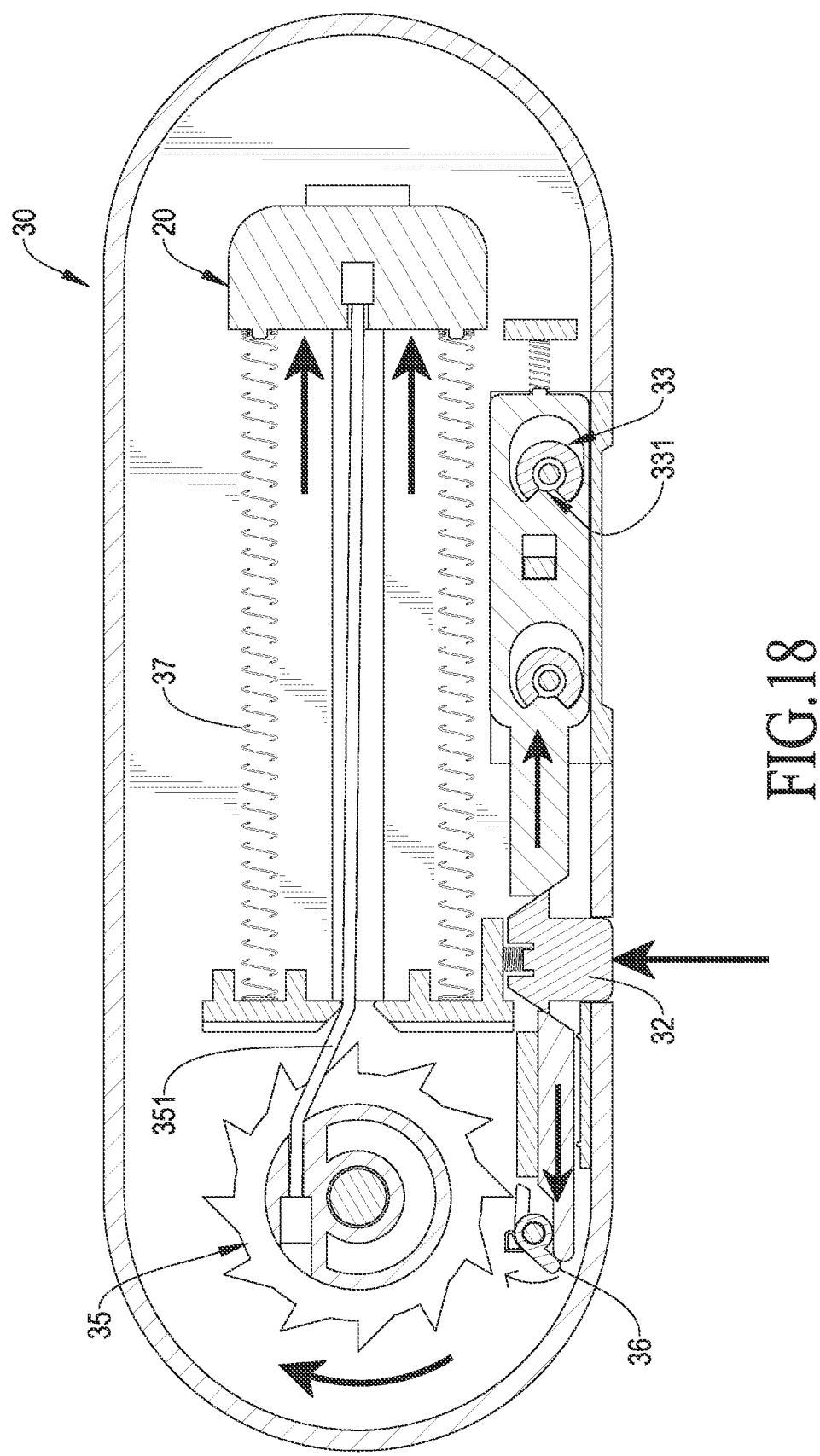

Moreover, the unlocking component 32 may drive the engaging component 31 directly as shown in the first embodiment and the second embodiment, or the unlocking component 32 may be operated to allow the second base 20 to be moved or rotated (as shown in FIGS. 17 and 18), and in turn driving the first base 10 to move or rotate, thereby allowing the first base 10 to disengage from the engaging component 31 (as shown in the third embodiment).

The first base 10 and the second base 20 function as a male part and a female part that are configured to be fitted together and form a buckle (as shown in the first and the second embodiments), while the lock mechanism 30 is simply configured to engage with the first base 10 and to lock and unlock, wherein the lock mechanism 30 may be disposed inside the second base 20.

The first base 10 and the lock mechanism 30 may function as said male and female parts (as shown in the third embodiment), while the second base 20 is mainly configured to generate the magnetic attraction force for guiding, wherein the second base 20 may be disposed inside the lock mechanism 30.

The first embodiment of the present invention is shown in FIGS. 1 to 6, and detailed description of the first embodiment is as follows.

The second base 20 and the first base 10 detachably engage with each other such that in the locked status, the first base 10, the second base 20, and the engaging component 31 engage with each other, and therefore are inseparable.

Figure 5:
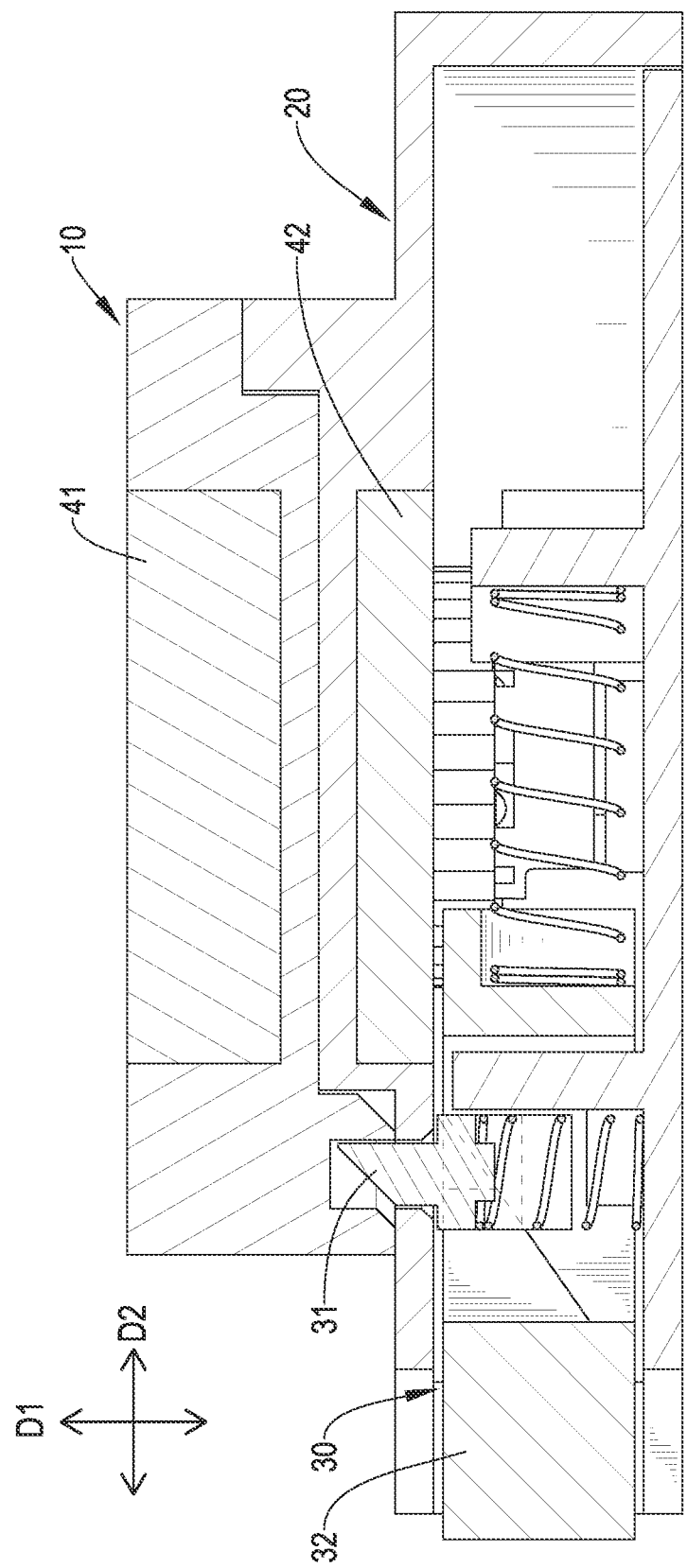
FIGS. 5 and 6 are side sectional views of the magnetic buckle device in FIG. 1, showing different operating statuses of the magnetic buckle device.

Preferably, in the locked status, the second base 20 prevents the first base 10 from moving along a first direction D1 (upward and downward, for example), and the engaging component 31 prevents the first base 10 from moving along a second direction D2 (transverse, for example). The first direction D1 and the second direction D2 are nonparallel such that the second base 20 and engaging component 31 engage the first base 10 from two different directions to firmly fix the first base 10 (as shown in FIGS. 1 and 5). To be precise, the first direction D1 extends upwards and downwards, while the second direction D2 extends transversely; that is, the first direction D1 and the second direction D2 are preferably perpendicular to each other.

In the preferred embodiment, the first base 10 has at least one first engaging portion 11, and the second base 20 has at least one second engaging portion 21 which is preferably disposed on a top surface of the second base 20. A number of the first engaging portion 11 is preferably two, and a number of the second engaging portion 21 is preferably two.

Each of the two first engaging portions 11 has an inclined surface 111, and each of the two second engaging portions 21 has an inclined surface 211. The two inclined surfaces 111 are preferably parallel, and the two inclined surfaces 211 are preferably parallel. A normal of the inclined surface 111 is nonparallel to a normal of the inclined surface 211.

The first base 10 and the second base 20 engage with each other via the engaging portions 11, 12 to prevent the first base 10 from moving along the first direction D1 (upward and downward). To be specific, the first engaging portion 11 engages upward and downward between the top surface of the second base 20 and the second engaging portions 21.

The engaging component 31 of the lock mechanism 30 normally moves along the first direction D1 (upward) such that the first base 10 is clamped between the second engaging portion 21 and the engaging component 31, thereby preventing the first base 10 from moving along the second direction D2 (left and right, as shown in FIG. 5). To be precise, the engaging component 31 normally moves upward.

Figure 6:
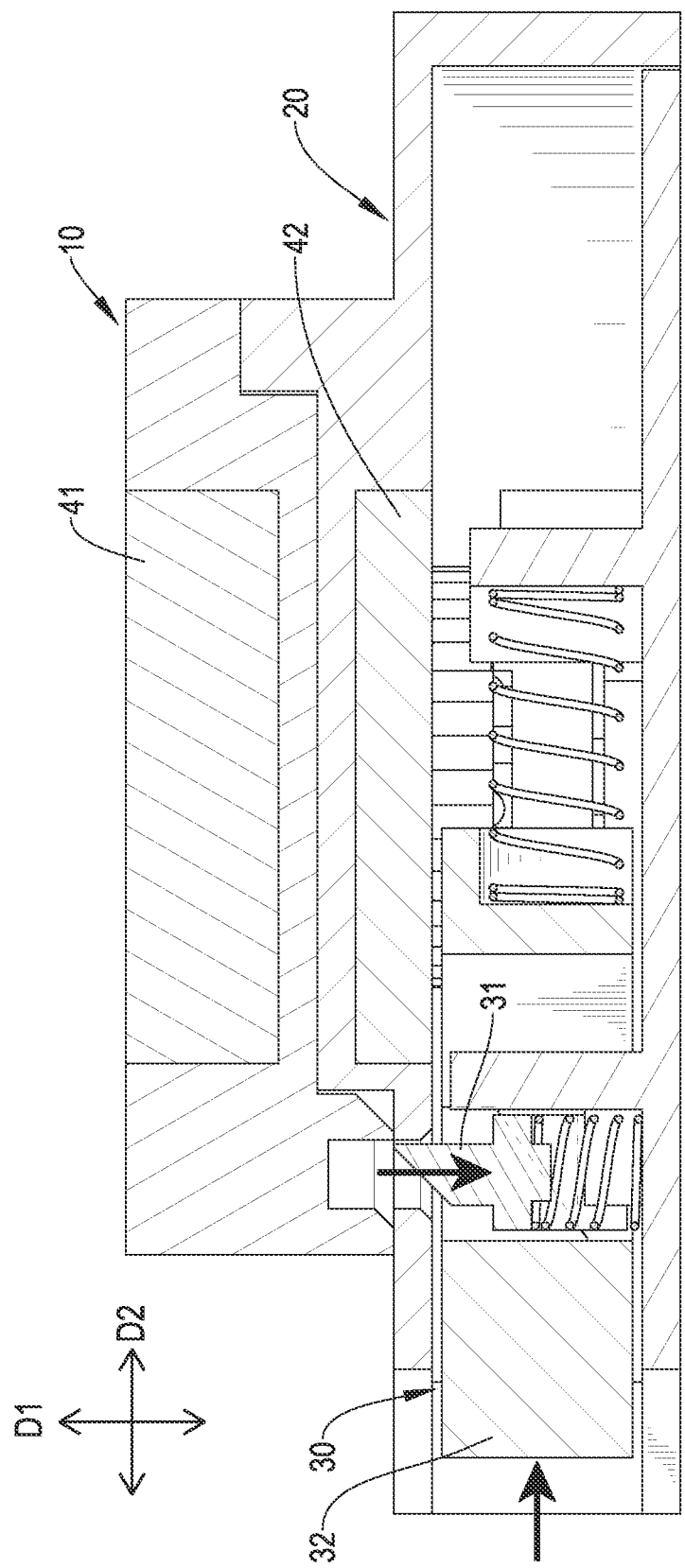

The unlocking component 32 is a press-to-release component movable along the second direction D2. When the unlocking component 32 is pressed along the second direction D2 (left and right), the unlocking component 32 drives the engaging component 31 to move along the first direction D1 (downward) to unclamp the first base 10 (as shown in FIG. 6).

Moreover, the lock mechanism 30 preferably includes at least one number wheel 33. When the number wheel 33 is not rotated to an unlock angle, the number wheel 33 abuts against the unlocking component 32 to prevent the unlocking component 32 from being pressed, thereby keeping the lock mechanism 30 in the locked status.

On the other hand, when the number wheel 33 is rotated to the unlock angle, a notch 331 of the number wheel 33 is directed toward the unlocking component 32, thereby allowing the unlocking component 32 to be pressed to switch the lock mechanism 30 from the locked status to the unlocked status.

Figure 7:
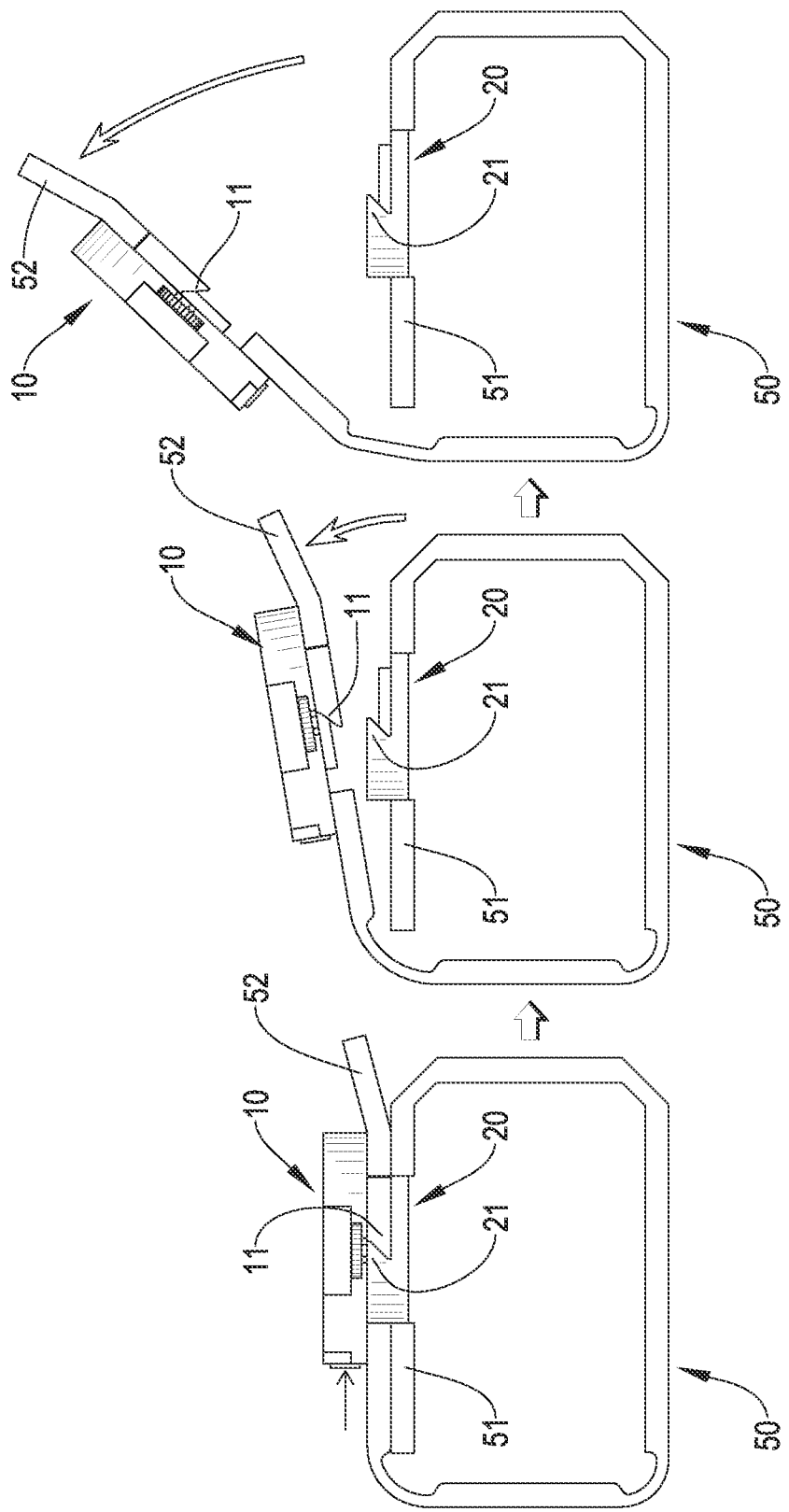
FIG. 7 is a side view showing the magnetic buckle device in FIG. 1 used on a box.
Figure 8:
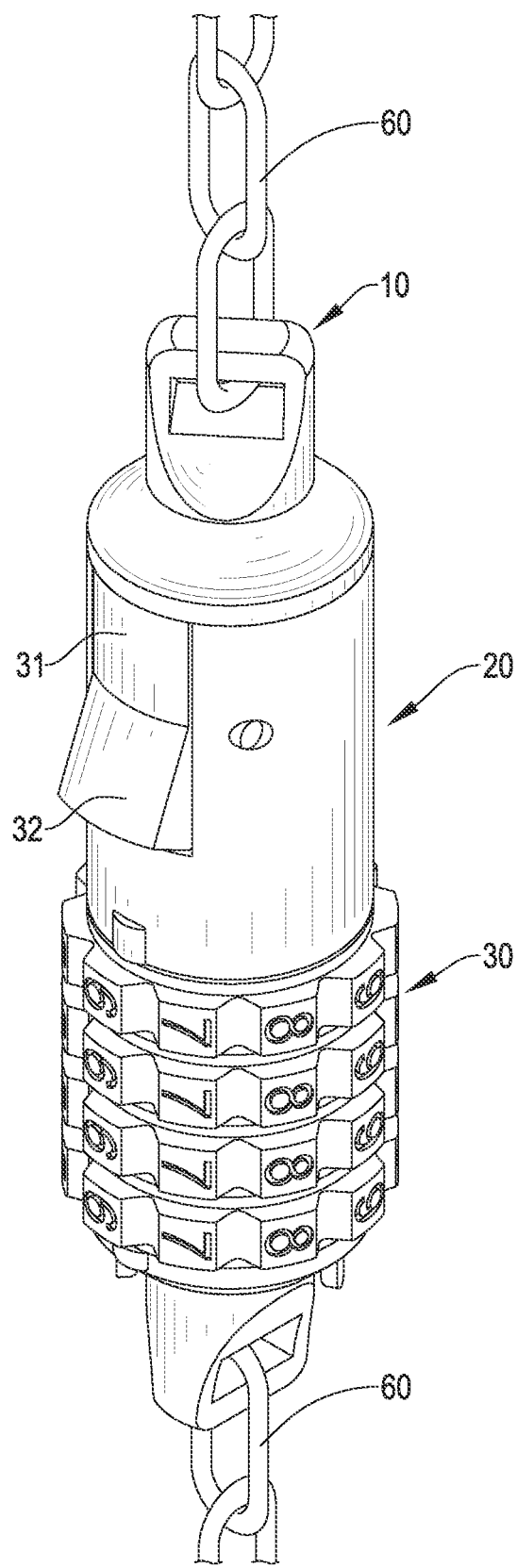
FIG. 8 is a perspective view of a second embodiment of the magnetic buckle device in accordance with the present invention, showing the magnetic buckle device used in a chain lock.
Figure 9:
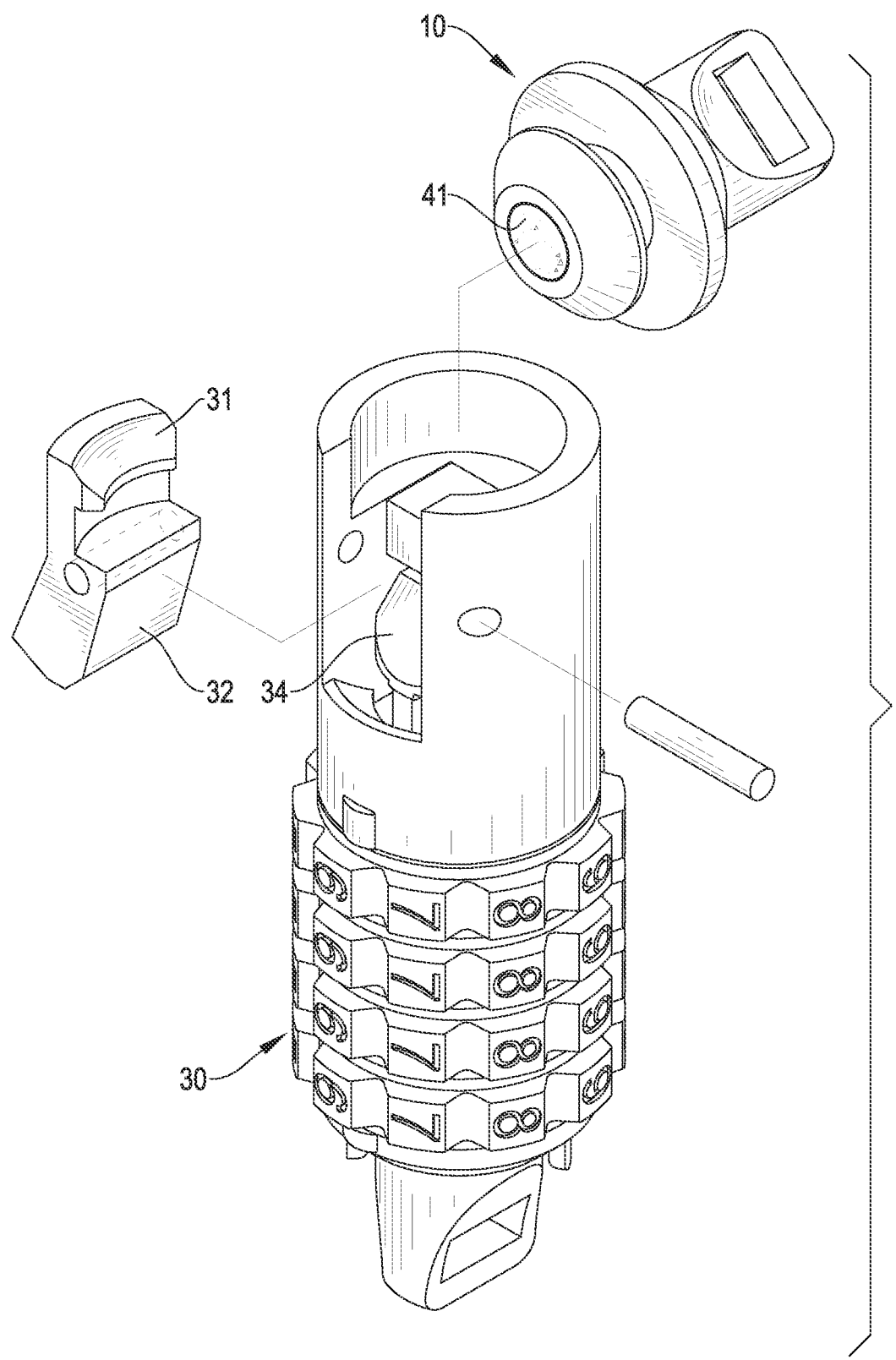
FIG. 9 is an exploded perspective view of the magnetic buckle device in FIG. 8.

The first embodiment can be used in different applications. With reference to FIG. 7, the first embodiment can be used on a box 50. The second base 20 and the lock mechanism 30 are mounted on a top plate 51 of the box 50, and the first base 10 is mounted on an upper cover 52.

In the locked status, the upper cover 52 cannot be flipped up. In the unlocked status, the first embodiment is still resistant to transverse pulling force despite the engaging component 31 is already retracted, but the engaging portions 11, 21 can be disengaged by gently lifting up the first base 10. As a result, the first embodiment can be unbuckled by lifting up the upper cover 52 in the unlocked status.

Moreover, during a process of connecting the first base 10 with the second base 20, even a relative angle between the two bases 10, 20 are slightly misaligned, the magnetic attraction force will correct the relative angle such that the two bases 10, 20 for ease of buckling.

Additionally, the first embodiment can be used for a backpack. For example, a meshed plate can be mounted on an outer surface of the backpack; a bottom edge of the meshed plate is fixed to a bottom side of the backpack, while two lateral edges and a top edge of the backpack are connected to the outer surface of the backpack using elastic cords that are mounted back and forth through the meshed plate and the outer surface of the backpack.

Ends of the elastic cords are disposed adjacent to the upper edge of the meshed plate. The end of each elastic cord has a first base 10 mounted thereto, while a second base 20 and a lock mechanism 30 corresponding to said first base 10 are mounted on the outer surface of the backpack. As a result, the meshed plate is disposed on the outer surface of the backpack with the elastic cords, and objects such as jacket and raincoat can be put between the meshed plate and the outer surface of the backpack.

The second embodiment of the present invention is shown in FIGS. 8 to 12, and detailed description of the first embodiment is as follows.

The second base 20 and the first base 10 also detachably engage with each other. To be precise, the first base 10 and the second base 20 detachably engage with each other along a direction of the magnetic attraction force, which is directed upward and downward, between the first component 41 and the second component 42.

The second base 20 preferably has an upper opening to accommodate the first base 10. When the first base 10 is inserted into the second base 20, horizontal movement of the first base 10 is limited by an inner wall of the second base 20 such that the second base 20 is horizontally fixed or has limited horizontal movement.

In the second embodiment, the engaging component 31 and the unlocking component 32 of the lock mechanism 30 are rigidly connected to each other such that the engaging component 31 and the unlocking component 32 are moved or rotated together. To be precise, the engaging component 31 and the unlocking component 32 are two portions of a same component which is pivotally mounted to the second base 20.

Figure 10:
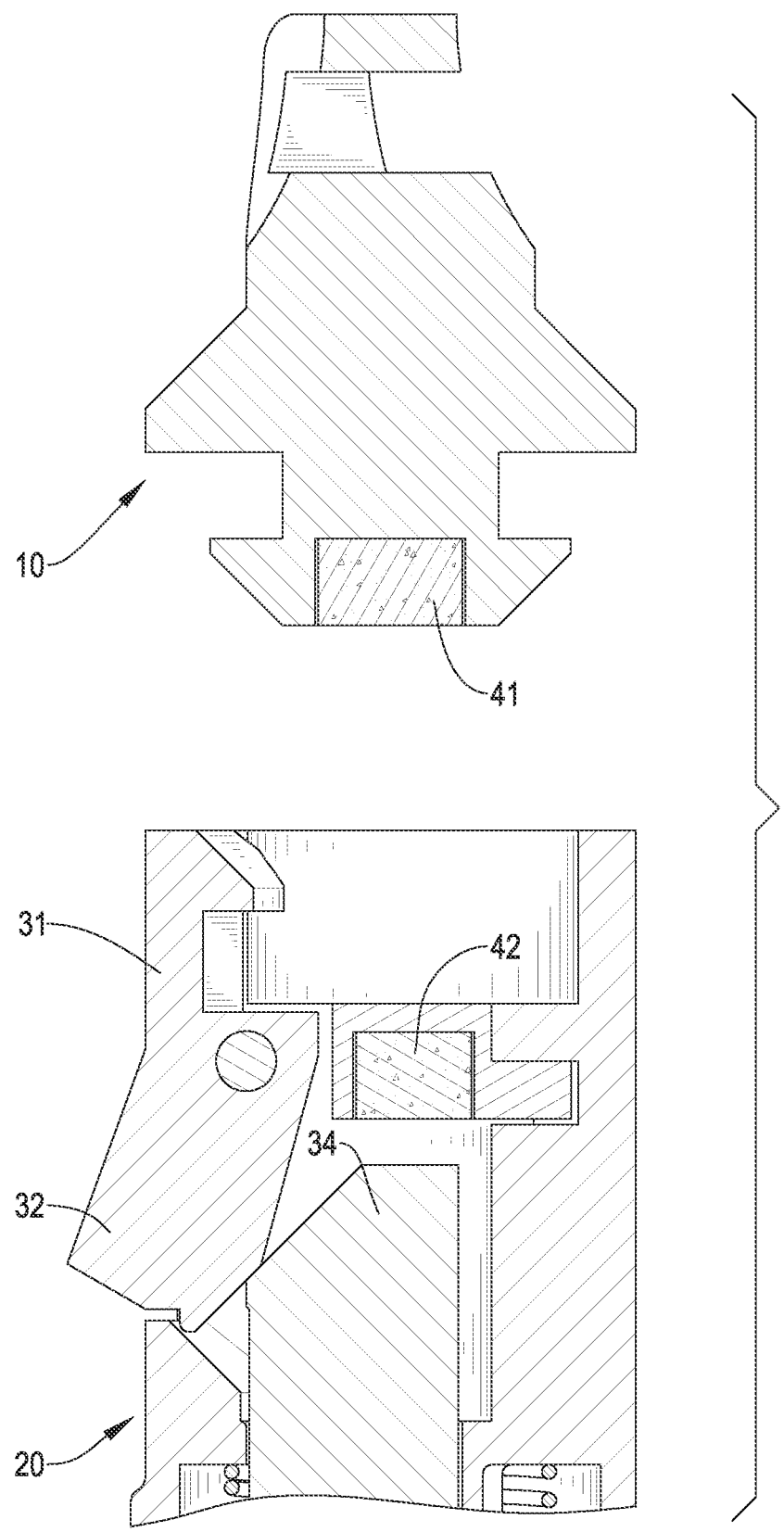
FIGS. 10 to 12 are side sectional views of the magnetic buckle device in FIG. 8, showing different operating statuses of the magnetic buckle device.

The lock mechanism 30 further has a lock rod 34. The lock rod 34 normally abuts against the engaging component 31 and the unlocking component 32 and makes the engaging component 31 pivot toward an engaging direction (as shown in FIG. 10).

Figure 11:
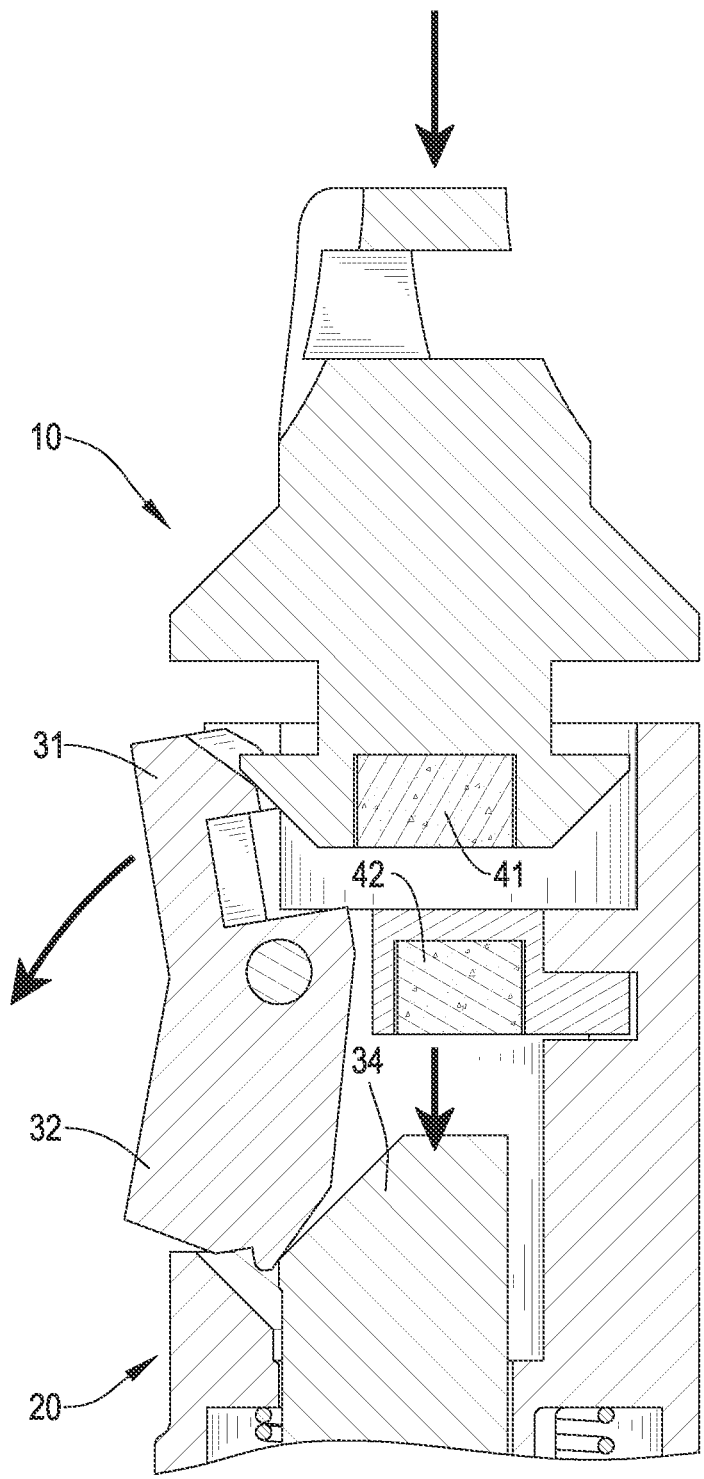

During a process of connecting the first base 10 with the second base 20, the first base 10 is preferably inserted downward into the second base 20 and pushes the engaging component 31 away from an original position such that the lock rod 34 is moved downward slightly (as shown in FIG. 11).

Figure 12:
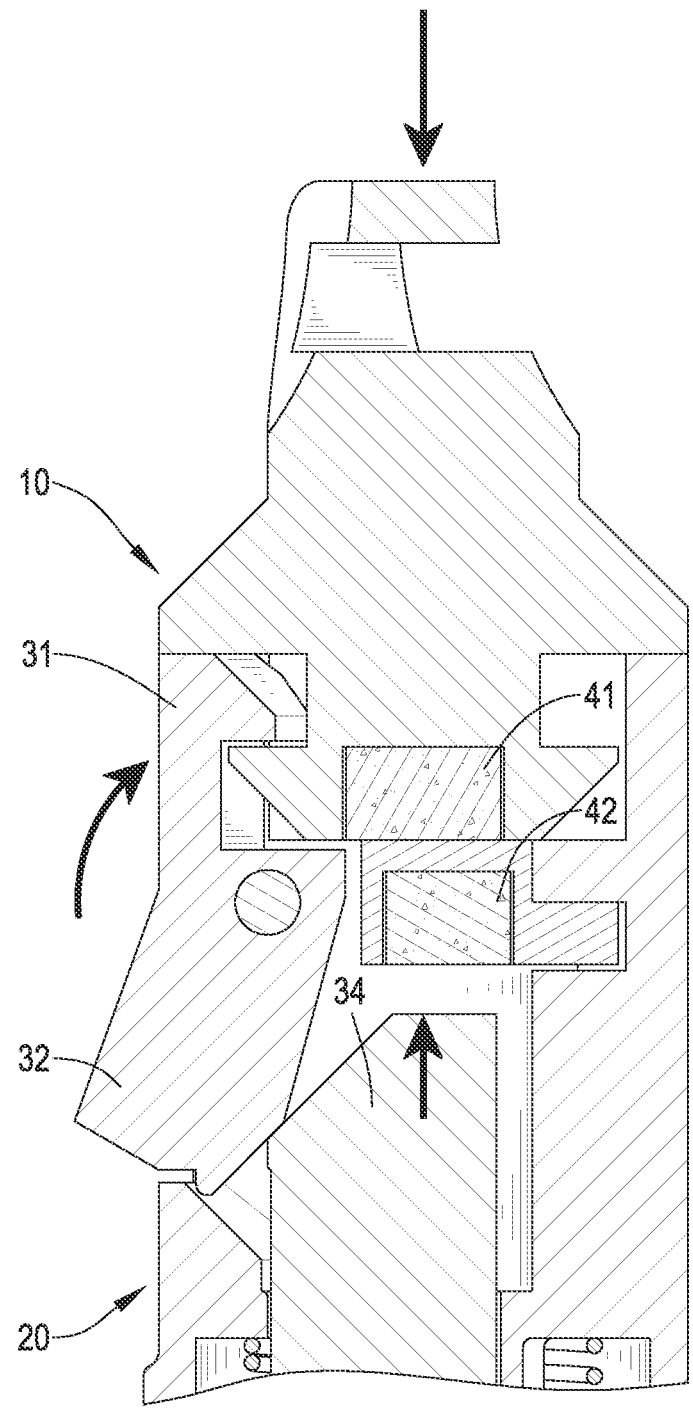
Figure 13:
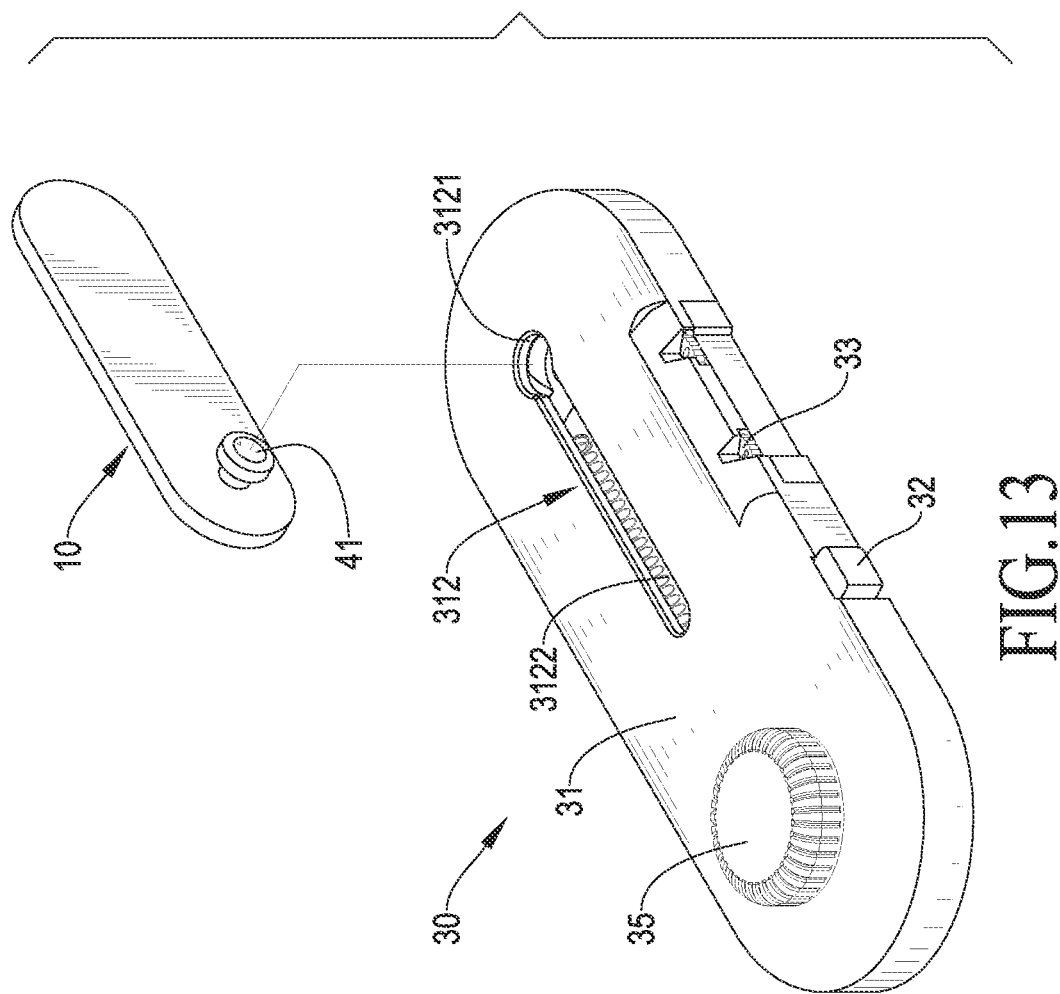
FIG. 13 is a perspective view of a third embodiment of the magnetic buckle device in accordance with the present invention.
Figure 14:
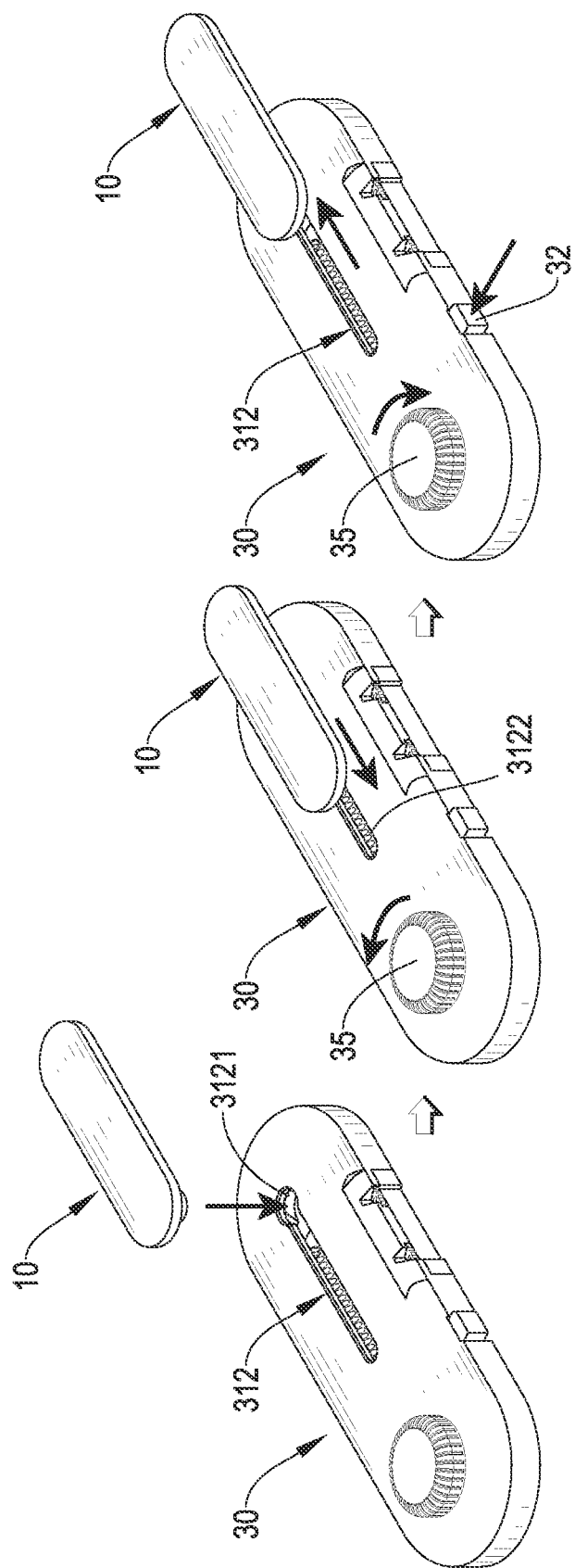
FIG. 14 is a perspective view showing different operating statuses of the magnetic buckle device in FIG. 13.
Figure 15:
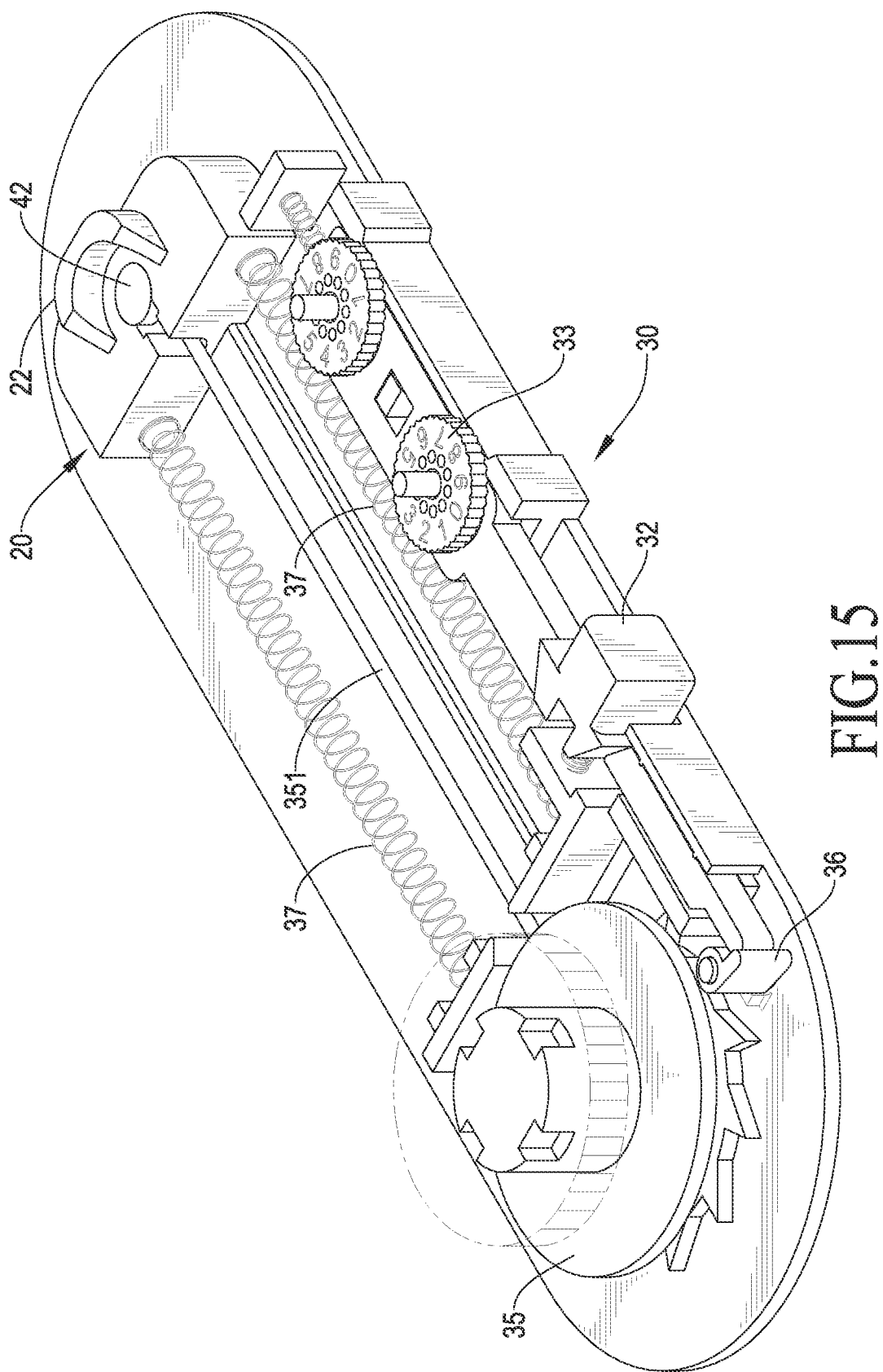
FIGS. 15 and 16 are exploded perspective views of the magnetic buckle device in FIG. 13.
Figure 16:
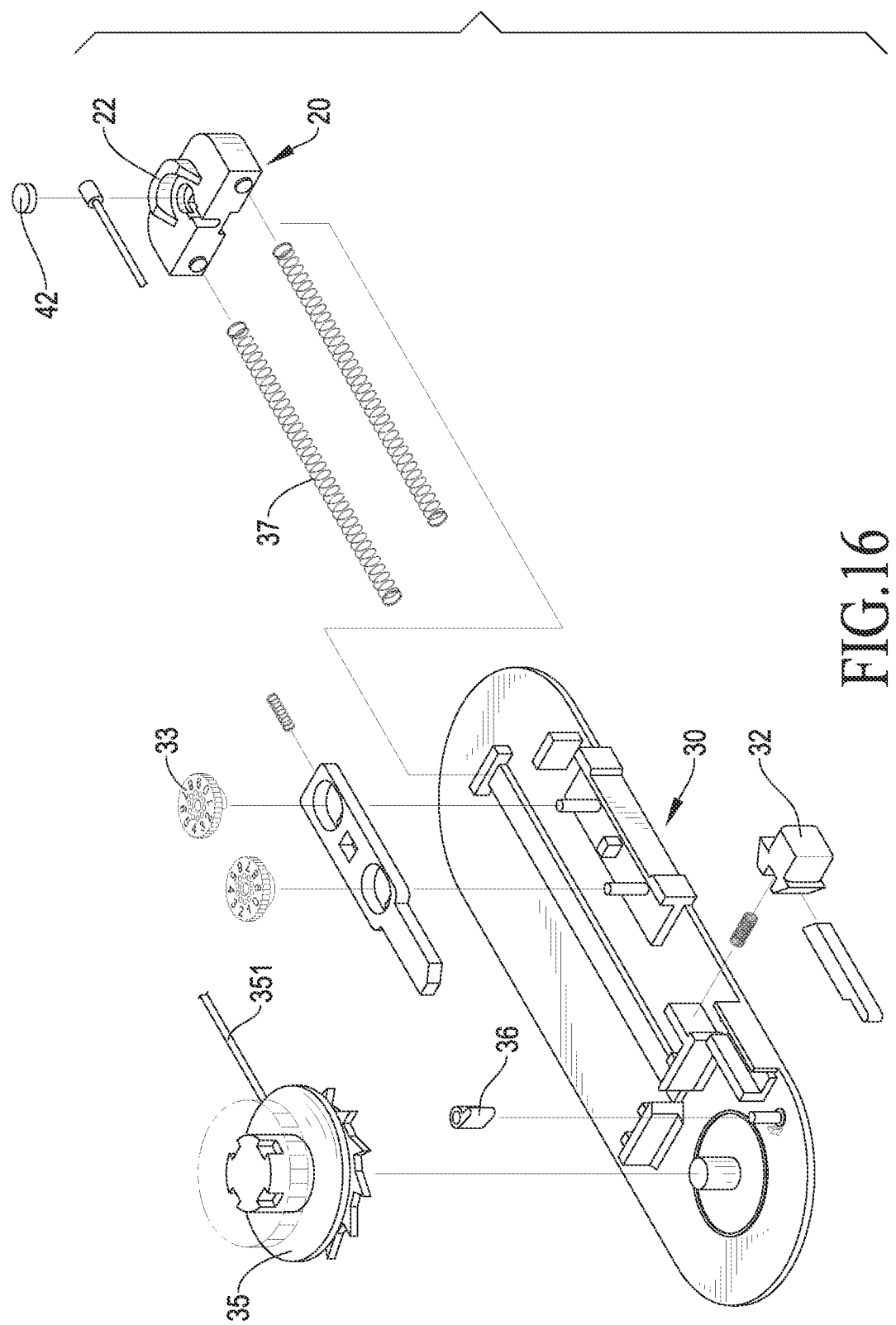

Upon finishing the process of connecting the first base 10 with the second base 20, which practically means the first base 10 is fully inserted into the second base 20, the lock rod 34 is returned to its previous position and the engaging component 31 engages with the first base 10 (as shown in FIG. 12).

In the locked status, the lock rod 34 is prevented from moving downward, thereby preventing the unlocking component 32 from being pressed to pivot and keeping the engaging component 31 engaging with the first base 10. In the locked status, the lock rod 34 is allowed to move downward, and therefore the unlocking component 32 can be pressed to disengage the engaging component 31 from the first base 10.

The second embodiment can be used in a chain lock. The first base 10 and the second base 20 are connected on two ends of the chain 60 respectively such that the two ends of the chain 60 can be fixed together using the second embodiment.

The third embodiment of the present invention is shown in FIGS. 13 to 19, and detailed description of the first embodiment is as follows.

The engaging component 31 of the lock mechanism 30 is a plate, and is preferably a top plate of the lock mechanism 30. The engaging component 31 has an elongated hole 312. The elongated hole 312 has an entrance section 3121 and an engaging section 3122.

The entrance section 3121 is greater in width than the engaging section 3122 such that the first base 10 is capable of passing through the entrance section 3121 to be mounted through the engaging component 31, but incapable of leaving the engaging component 31 through the engaging section 3122.

Figure 19:
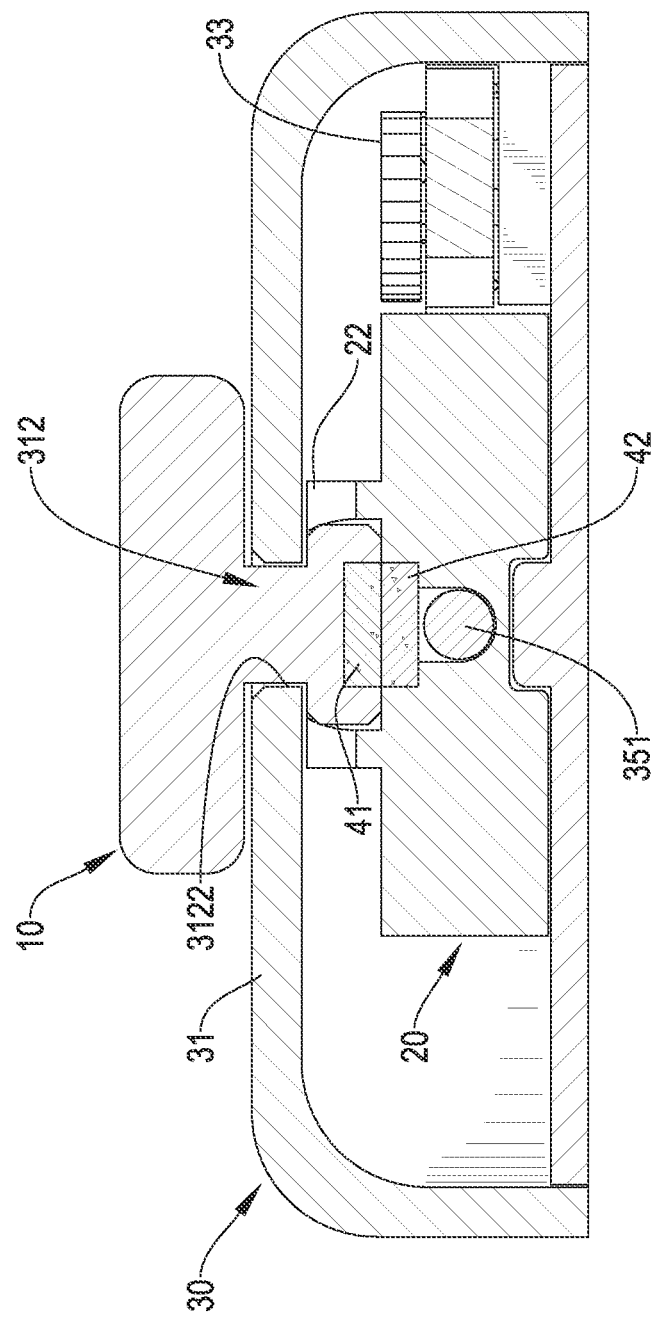
FIG. 19 is an end sectional view of the magnetic buckle device in FIG. 13.

The lock mechanism 30 has a shifter 35 configured to move the first base 10 from the entrance section 3121 toward the engaging section 3122 when the first base 10 is mounted through the engaging component 31 via the entrance section 3121. As a result, when the first base 10 is mounted through the entrance section 3121 and then moved to the engaging section 3122 by a user via operating the shifter 35, the first base 10 cannot be separated from the lock mechanism 30 (as shown in FIG. 19).

The second base 20 is preferably disposed inside the lock mechanism 30 and is linearly movable between a position under the entrance section 3121 and a position under the engaging section 3122.

When the first base 10 is mounted through the entrance section 3121 of the engaging component 31, the first base 10 is attached to the second base 20 due to the magnetic attraction force between the first component 41 and the second component 42.

The shifter 35 is connected to the second base 20 and configured to move the first base 10 via moving the second base 20. The second base 20 preferably has an abutting portion 22 disposed thereon, and the abutting portion 22 abuts against the first base 10 to move the first base 10.

In the preferred embodiment, the first base 10 is moved by the abutting portion 22 and the magnetic attraction force together, but not limited thereto. In another preferred embodiment, the first base 10 is moved only by the magnetic attraction force.

Preferably, the shifter 35 is connected to the second base 20 via a cable 351 and is configured to be rotated along a winding direction to wind the cable 351 therearound, thereby pulling the second base 20 (as shown in FIG. 17).

In the unlocked status, the unlocking component 32 of the lock mechanism 30 is capable of being operated to allow the shifter 35 to be rotated along an unwinding direction, thereby allowing the second base 20 to be moved from the engaging section 3122 to the entrance section 3121 (as shown in FIG. 18). After being moved to the entrance section 3121, the first base 10 can be separated from the engaging component 31 by pulling the first base 10 out from the entrance section 3121.

Preferably, the unlocking component 32 is a press-to-release component normally pushed outward. The lock mechanism 30 has at least one number wheel 33. When the number wheel 33 is not rotated to an unlock angle, the unlocking component 32 is prevented from being pressed, thereby keeping the lock mechanism 30 in the locked status (as shown in FIG. 17).

When the number wheel 33 is rotated to the unlock angle, a notch 331 of the number wheel 33 is directed toward the unlocking component 32, thereby allowing the unlocking component 32 to be pressed to switch the lock mechanism 30 from the locked status to the unlocked status (as shown in FIG. 18).

In yet another embodiment, the shifter 35 is directly connected to the first base 10 to move the first base; that is, the shifter is not limited to move the first base 10 indirectly via the second base 20.

Preferably, the lock mechanism 30 has a rotation-locking part 36. When not pressed, the unlocking component 32 abuts against the rotation-locking part 36 to make the rotation-locking part 36 engage with the shifter 35, thereby allowing the shifter 35 to be rotated along the winding direction only (as shown in FIG. 17).

On the other hand, after the unlocking component 32 is pressed, the unlocking component 32 pushes the rotation-locking part 36 such that the rotation-locking part 36 no longer engages the shifter 35, thereby allowing the shifter 35 to be rotated along the unwinding direction (as shown in FIG. 18).

Preferably, the lock mechanism 30 has a returning device 37. The returning device 37 makes the first base 10 move toward the entrance section 3121. The returning device 37 is preferably connected to the second base 20 and moves the first base 10 via the second base 20. In the preferred embodiment, the returning device 37 is at least one compression spring, but not limited thereto. Moreover, the returning device 37 can be omitted such that the first base 10 is manually moved toward the entrance section 3121.

When the third embodiment is in use, insert the first base 10 through the entrance section 3121, and then the first base 10 is attracted by and attached to the second base 20 by the magnetic attraction force. Then, the user rotates the shifter 35 to wind the cable 351 to pull the second base 20 and the first base 10. The first base 10 is then moved to the position under the engaging section 3122 such that the first base 10 cannot disengage from the engaging component 31.

In the unlocked status, press the unlocking component 32 to disengage the rotation-locking part 36 from the shifter 35 such that the shifter 35 is allowed to rotate and the cable 351 no longer forcefully pulls the second base 20. As a result, the returning device 37 pushes the second base 20 and the first base 10 back to the entrance section 3121, thereby allowing the first base 10 to be taken out from the second base 20.

Figure 20:
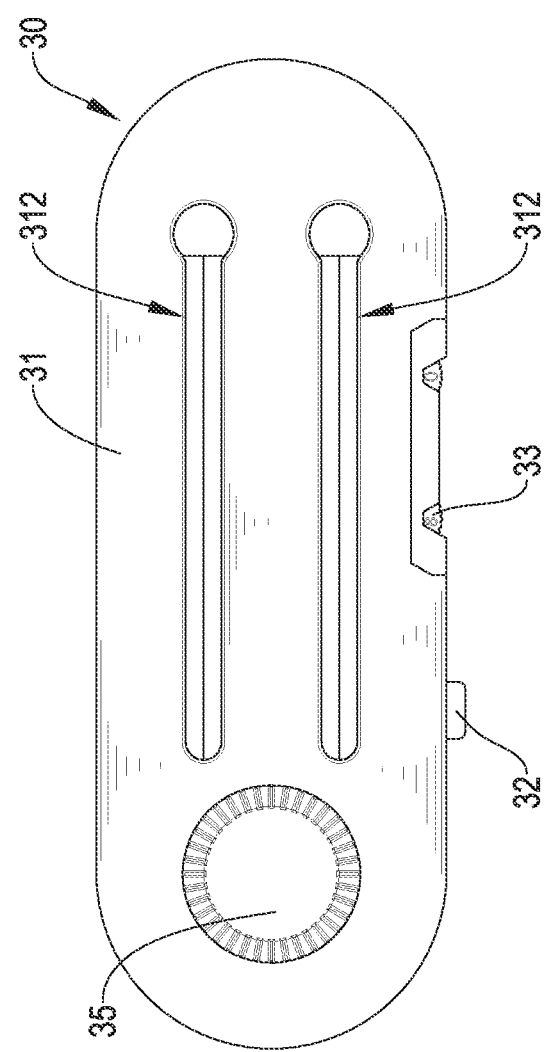
FIG. 20 is a schematic top view of the magnetic buckle device in FIG. 13, showing the magnetic buckle device used in a zipper.

With reference to FIG. 20, the third embodiment can be used on a zipper; that is, the elongated hole 312 of the engaging component 31 is designed as a zipper, and the first base 10 is a zipper head. Rotating the shifter along the winding direction gradually closes the zipper, and the zipper is automatically opened when the unlocking component 32 is pressed in the unlocked status by the first base which automatically returns.

In another preferred embodiment, multiple cables 351 can be wound on one shifter 35 such that multiple sets of the second bases 20 and first bases 10 can be pulled by one shifter 35, and multiple zippers can be opened by pressing one unlocking component 32.

Figure 21:
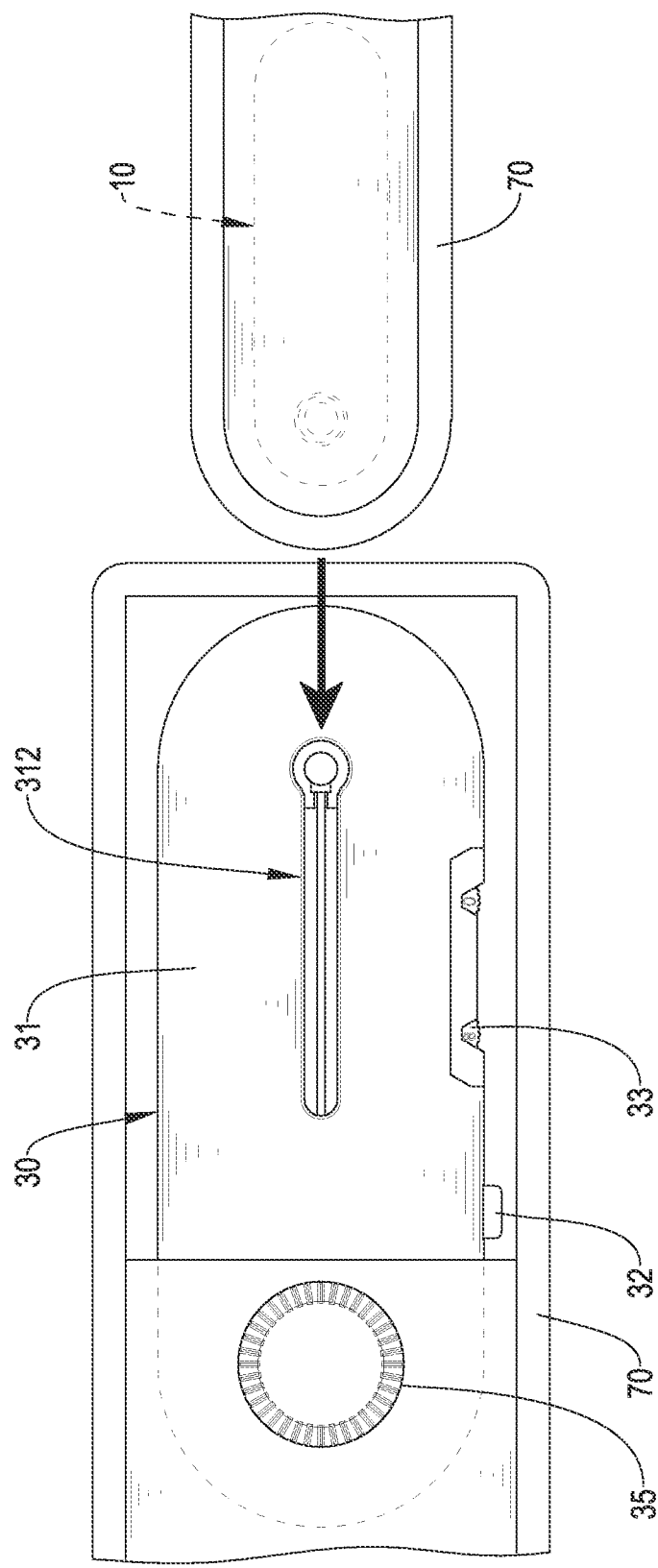
FIG. 21 is a schematic top view of the magnetic buckle device in FIG. 13, showing the magnetic buckle device used in connecting two strips.

With reference to FIG. 21, the third embodiment may be used to connect two strips 70, such as two strips 70 of a crossbody bag. Two ends of the two strips are located in front of the chest of the user. The user connects the two strips using the third embodiment and then tightens the two strips 70 by rotating the shifter 35.

The third embodiment can be used on a backpack, especially a backpack having a top opening and the top opening is closed by rolling an upper end of the backpack. The third embodiment is configured to ensure the upper end of the backpack is kept at a rolled status, and is capable of adjusting relative position between the first base 10 and the second base 20 to correspond to different degrees of rolling.

Among the first through third embodiments, the magnetic attraction force generated between the first component 41 and the second component 42 has substantial effect on guiding during a process of connecting the first base 10 to the second base 20 such that the first base 10 and the second base can be connected with ease. The magnetic attraction force also helps to keep the first base 10 to the second base 20 connected. As a result, the present invention improves the ease of use of the magnetic buckle device.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A magnetic buckle device configured to detachably connect a first object and a second object, the magnetic buckle device comprising:
   a first base configured to be connected to the first object;
   a second base configured to be connected to the second object;
   a first component mounted to the first base;
   a second component mounted to the second base, wherein a magnetic attraction force is generated between the first component and the second component to move the first base and the second base toward each other; and
   a lock mechanism connected to the second base and having a locked status and an unlocked status, the lock mechanism having an engaging component and an unlocking component;
   wherein, in the locked status, the first base and the engaging component engage with each other such that the first base and the engaging component are inseparable and, in the unlocked status, the unlocking component being capable of being operated to allow the first base and the engaging component to disengage from each other.

2. The magnetic buckle device as claimed in claim 1, wherein the second base and the first base detachably engage with each other; and in the locked status, the first base, the second base, and the engaging component engage with each other such that the first base, the second base, and the engaging component are inseparable.

3. The magnetic buckle device as claimed in claim 2, wherein in the locked status, the second base prevents the first base from moving along a first direction, and the engaging component prevents the first base from moving along a second direction; and the first direction and the second direction are nonparallel.

4. The magnetic buckle device as claimed in claim 3, wherein the first base and the second base each have an inclined surface;
   the second base and the first base detachably engage with each other via the inclined surface of the first base and the inclined surface of the second base; and
   a normal of the inclined surface of the first base and a normal of the inclined surface of the second base are nonparallel to the first direction and the second direction.

5. The magnetic buckle device as claimed in claim 1, wherein the engaging component has an elongated hole having an engaging section and an entrance section;
- the entrance section being greater in width than the engaging section such that the first base is capable of passing through the entrance section to be mounted through the engaging component, but incapable of leaving the engaging component through the engaging section; and
- the lock mechanism has a shifter configured to move the first base from the entrance section toward the engaging section when the first base is mounted through the engaging component via the entrance section.

6. The magnetic buckle device as claimed in claim 5, wherein the lock mechanism has a returning device which makes the first base move toward the entrance section.

7. The magnetic buckle device as claimed in claim 5, wherein when the first base is mounted through the engaging component via the entrance section, the first base is attached to the second base due to the magnetic attraction force between the first component and the second component; and
- the shifter is connected to the second base and configured to move the first base via moving the second base.

8. The magnetic buckle device as claimed in claim 7, wherein the lock mechanism has a returning device which makes the first base move toward the entrance section.

9. The magnetic buckle device as claimed in claim 7, wherein the shifter is connected to the second base via a cable and configured to be rotated along a winding direction to wind the cable therearound, thereby pulling the second base; and
- in the unlocked status, the lock mechanism is capable of being operated to allow the shifter to be rotated along an unwinding direction, thereby allowing the second base to be moved from the engaging section to the entrance section.

10. The magnetic buckle device as claimed in claim 9, wherein the lock mechanism has a returning device which makes the first base move toward the entrance section.

11. The magnetic buckle device as claimed in claim 1, wherein the first base and the second base detachably engage with each other along a direction of the magnetic attraction force between the first component and the second component.

12. The magnetic buckle device as claimed in claim 1, wherein the engaging component and the unlocking component of the lock mechanism are connected to each other, such that the engaging component and the unlocking component are moved or rotated together;
- the first base pushes the engaging component away from an original position during a process of connecting the first base with the second base; and
- the lock mechanism makes the engaging component return to the original position and engage with the first base upon finishing the process of connecting the first base with the second base.

13. The magnetic buckle device as claimed in claim 1, wherein in the unlocked status, the unlocking component is configured to be operated to make the first base disengage from the engaging component.

14. The magnetic buckle device as claimed in claim 1, wherein the second base drives the first base to move or rotate; and
- in the unlocked status, the unlocking component is configured to be operated to allow the second base to be moved or rotated, and in turn driving the first base to move or rotate.

\* \* \* \* \*